Aug. 7, 1951    A. J. C. WILSON    2,563,439
X-RAY POWDER CAMERA
Filed May 26, 1949
Fig. 1.
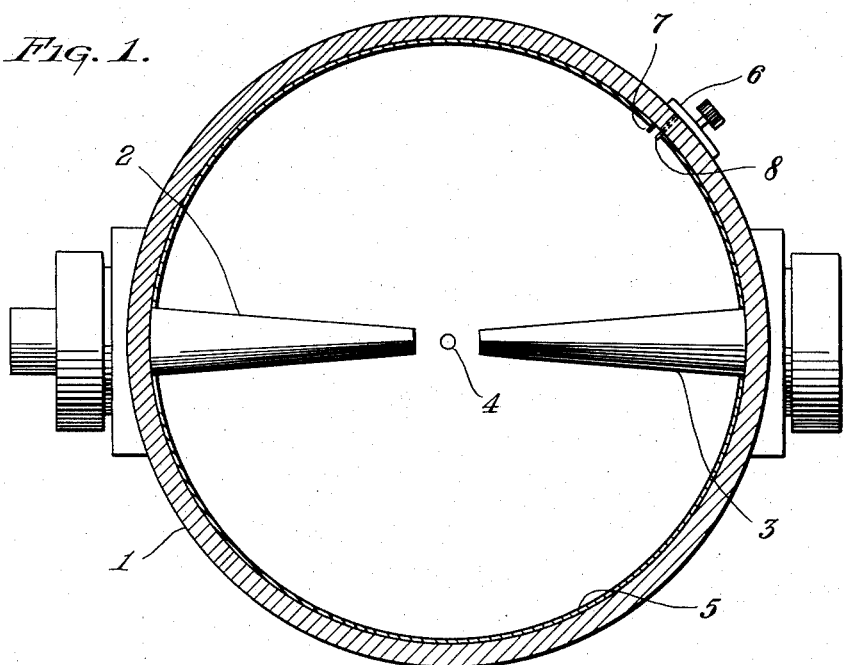
Fig. 2a.
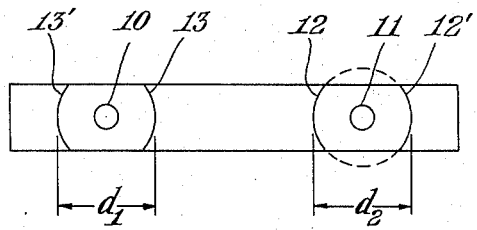
Fig. 2b.
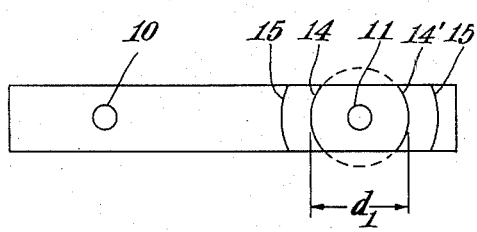
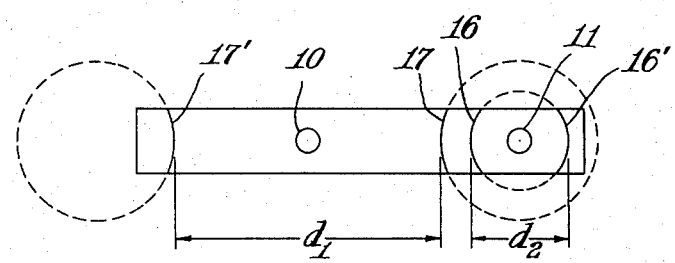
Fig. 2c.
ARTHUR J. C. WILSON.
INVENTOR.
BY
AGENT.

Patented Aug. 7, 1951

2,563,439

UNITED STATES PATENT OFFICE 2,563,439

X-RAY POWDER CAMERA

Arthur J. C. Wilson, Cathays Park, Cardiff, Wales, assignor to Philips Laboratories, Inc., Irvington on Hudson, N. Y.

Application May 26, 1949, Serial No. 95,451

5 Claims. (Cl. 250—65)

My invention relates to X-ray powder cameras and a film mounting technique therefor.

It is well-known that X-ray diffraction patterns of powder specimens can be obtained with cameras of generally cylindrical design in which a film for recording the pattern is positioned on the inner peripheral wall of the camera and the specimen is positioned centrally within the camera. The resulting diffraction pattern obtained when a sharply defined beam of nearly monochromatic X-radiation is directed at the specimen appears as a series of cone-arcs on the film having their apices at the specimen. Depending upon the wave-length of the radiation, the positions of the cone-arcs on the film are a measure of the spacings of the atomic planes within the specimen which can be determined according to the well-known Bragg equation.

Precise determination of the spacings of the atomic planes or lattice spacings is directly dependent, however, upon an accurate knowledge of the effective diameter of the camera. Because of difficulties in accurately determining the camera diameter by mechanical measures, it is common practice to establish the effective camera diameter by measurements on the film which incidentally serves to self-calibrate the film for further measurements thereon.

Various methods have been devised for determining the effective camera diameter accurately by measurements on the film itself after development. It might be mentioned at this point that during development, the film shrinks making any reference points placed on the film before exposure unsuitable for determining the effective camera diameter.

Two methods which had been devised for this purpose are known as the van Arkel method and the Bradley-Jay method both of which are completely described in the literature. Briefly, in these methods, permanently fixed knife edges are provided in the camera and the distance between the knife edges is precisely measured with a spectrometer or other precision device. During exposure, the knife edges cast sharp shadow edges upon the film and the distance between those lines is measured. The effective diameter can then be computed from the distance between the shadow edges.

These methods, however, are cumbersome because the original calibration of the knife edges must be made with great accuracy. Moreover, some cameras are not readily adapted to be fitted with knife edges. Furthermore, the use of knife edges produces blind spots on the film which prevents the recording of lines in that region. This is important where low angle lines can be recorded on the film particularly with cameras of the type disclosed in United States patent application Serial No. 728,828, filed February 15, 1947, which issued on July 11, 1950 as Patent No. 2,514,791, with which diffraction patterns with low-angle lines can be recorded on the film.

To avoid that cumbersome approach a new strategy was developed which only required certain measurements to be made on the film for determining the effective camera diameter. That method is referred to as the Straumanis method and is described in detail in the work by M. Straumanis and A. Levins—Die Prazionsbesstimmung von Gitterkonstanten nach der Asyjmmetrischen Methode (published by J. W. Edwards, Ann Arbor, Michigan, 1948) and in X-ray Crystallography by Buerger on pages 395 and 396 (published by John Wiley & Sons, Inc., New York, 1942).

Briefly, the Straumanis method requires the film to be mounted asymmetrically in the camera so that the ends of the film abut along an axis which is perpendicular to the axis of the X-ray beam. The method, however, requires diffraction lines in both the front and back reflection regions in order to fix the 0° and 180° position on the film. The front reflection region refers to reflection angles from 0° to 90° while the back reflection region refers to reflection angles from 90° to 180°.

Because a great many compounds, especially many organic and imperfectly crystallized compounds give no lines in the back reflection region, this method obviously will not work. The method will also not work when short-wave length radiation such as molybdenum -K radiation is directed at the specimen since weak or no lines are obtained in the back reflection region.

According to the invention, I provide an improved film mounting method which permits precision measurements of the effective camera diameter with all types of materials and radiations normally used. With the improved camera, no lines in the back-reflection region are required, although such lines may be present without impairing measurements, since measurements for determining effective camera diameter are made with lines solely in the front-reflection region.

In accordance with the invention, the camera is adapted to receive the film so that the ends of the film intercept the universally present diffraction lines in the front reflection region. This enables the determination of both the 0° and 180° positions on the film by measurements with lines in the front-reflection without recourse to measurements with lines, if any, in the back-reflection region. To determine the 0° position, the distance between a pair of corresponding cone arcs, i. e. two arcs of the cone which intercepts the film in the front reflection region and which appear at one end of the film, is measured which establishes the 0° position. For greater precision, of course, distances between several pairs of such cone-arcs, if they appear on the film, can be measured and averaged to fix the 0° position with even greater accuracy.

In order to determine the 180° position, a second pair of corresponding cone arcs, one of which appears at one end of the film and the corresponding arc thereof appears at the other end serve to establish the 180° position by measuring the distance between those arcs.

Having fixed both the 0° and 180° positions on the film of this manner, the effective camera diameter, for the purpose of further measurements on the film, is fixed since the distance between the 0° position and the 180° is equal to 180° 2θ, 2θ being the reflection angle.

The invention will now be described with reference to the drawing in which:

Fig. 1 shows a plan view in cross-section of a camera according to the invention;

Fig. 2a shows a film after development which had been mounted in the Straumanis manner;

Fig. 2b shows another film after development which had been mounted in the Straumanis manner; and Fig. 2c shows a film after development which is mounted according to the invention.

Referring to Fig. 1, the camera consists of a generally cylindrical enclosure 1 provided with two apertures spaced approximately 180° apart around the peripheral wall of the camera and into which fit a collimating system 2 and an exit port 3 respectively in axial alignment. Between the collimating system and the exit port the specimen 4 is mounted in the direct path of the collimated X-ray beam. Exit port 3 receives the primary beam of radiation passing directly through the specimen 4, thus preventing the film from being exposed by the direct beam of radiation.

Film 5 is mounted asymmetrically and at an angle between 0° and 90° with respect to the axis of the X-ray beam around the inner wall of the enclosure 1 which is achieved by placing both ends of the film against a film stop 6 comprising a fixed pin 7 and a slidable pin 8 secured to a movable handle. The film stop is shown positioned approximately 45° from the exit port tube 3 on the inner circumference of the camera, although the stop may be positioned at any point on the inner periphery in which arcs in the front reflection region are intercepted on both ends of the film. In other words, the angular position of the stop with respect to the exit tube can be fixed at a point between about 20° and about 75°.

To point out more clearly the improvement obtained by the present invention in determining the effective camera diameter by film measurement over the Straumanis method, reference is made to Figs. 2a, b, and c of the drawing. It will be remembered that in the Straumanis method, the film ends abut along an axis perpendicular to the X-ray beam axis whereas in the present arrangement the film ends abut along an axis which makes an angle between 20° and 75° with the X-ray beam axis.

Fig. 2a shows a conventional film after development which had been mounted in accordance with the Straumanis method. The apertures 10 and 11 are the openings in the film into which extend the collimating tube and the exit port respectively. To fix the 0° and 180° positions, the distances $d_2$ and $d_1$ between lines 12 and 12' and 13 and 13' respectively are measured and halved thus fixing those positions on the film. These distances are most conveniently measured by placing the film in a fixed position with reference to a fixed measuring scale and measuring the distances on the scale. If more lines are present, which for simplicity have been omitted, the centers are more accurately established by additional measurements. However, it will be noted that lines 13 and 13' are cone arcs appearing in the back-reflection region which, if they were not present would not enable the determination of the 180° position.

The latter is more clearly seen from Fig. 2b where, again for simplicity only a few lines are shown in the front reflection region. There are, however, no lines in the back-reflection region. Lines 14 and 14' and lines 15 and 15' are cone arc intercepts on the film in the front-reflection region which as can clearly be seen enable the determination of the 0° position only.

Referring to Fig. 2c, it will at once be seen that the pattern obtained in Fig. 2b obtained on a film mounted in accordance with the invention permits the determination of the 180° position. Lines 16 and 16' are cone arc intercepts on the film in the front reflection region, and can correspond to the cone arc intercepts 14 and 14' obtained by the Straumanis mounting. These lines fix the 0° position since by measuring the distance $d_2$ between those lines and halving the distance, the center of the circle, shown in dotted lines, is determined. Line 17 has its counterpart 17' appearing at the opposite end of the film since if the film were formed into a closed loop, the ends would abut and line 17' would be a portion of the circular intercept on the film of which arc 17 is also a part. Measuring the distance $d_1$ between lines 17 and 17' and halving that distance fixes the 180° position on the film.

Obviously, the presence of back reflection lines serves as no hindrance in making the measurements for the effective camera diameter. But, the essential factor is that the absence of those back-reflection lines still permits the effective camera diameter to be established which cannot be so established by the Straumanis method.

While I have thus described by invention with specific examples and applications, other obvious modifications thereof will be readily apparent to those skilled in the art without departing from the spirit and scope of the invention.

What I claim is:

1. A camera for X-ray diffraction photography of powder specimens comprising a generally cylindrical hollow enclosure, a pair of diametrically opposed apertures in the peripheral wall of said enclosure, a collimating system extending through one of said apertures in the peripheral wall for directing a beam of X-radiation along a given axis at a specimen in the enclosure, an exit tube axially aligned with said collimating system for receiving primary radiation passing through the specimen, and means to mount a photographic film asymmetrically around the inner peripheral wall of the said enclosure with the ends of the film in close proximity to each other and completely encircling the specimen comprising a film stop member positioned on the inner peripheral wall of the enclosure between the axis of the X-ray beam and an axis perpendicular thereto.

2. A camera for X-ray diffraction photography of powder specimens comprising a generally cylindrical hollow enclosure, a pair of diametrically opposed apertures in the wall of said enclosure, a collimating system for directing a beam of X-radiation along a given axis at a specimen in the enclosure which extends through one of the said apertures in the peripheral wall, an exit tube axially aligned with said collimating system for receiving X-radiation passing through the specimen, and means to mount a photographic film asymmetrically around the inner peripheral wall of the enclosure with the ends of the film in close proximity to each other and completely encircling the specimen comprising a film stop member positioned at an angle between about 20° and about 75° with the axis of the X-ray beam.

3. A camera for X-ray diffraction photography of powder specimens comprising a cylindrical hollow enclosure, a pair of diametrically opposed apertures in the wall of said enclosure, a collimating system for directing a beam of X-radiation along a given axis at a specimen in the enclosure which extends through one of the said apertures in the peripheral wall, an exit tube axially aligned with said collimating system for receiving X-radiation passing through the specimen, means to centrally mount the specimen between the collimating system and the exit tube and means to mount a photographic film asymmetrically around the inner peripheral wall of the enclosure with the ends of the film in close proximity to each other and completely encircling the specimen comprising a first pin member positioned at an angle about 20° and about 75° from one axis of the X-ray beam and a second adjustable pin member closely adjacent to the first pin member for positioning the ends of the film on the inner peripheral wall.

4. A camera for X-ray diffraction photography of powder specimens comprising a cylindrical hollow metallic enclosure, a pair of diametrically opposed apertures in the wall of said enclosure, a collimating system for directing a beam of X-radiation along a given axis at a specimen in the enclosure which extends through one of the said apertures in the peripheral wall, an exit tube axially aligned with said collimating system for receiving X-radiation passing through the specimen, means to centrally mount the specimen between the collimating system and the exit tube and means to mount a photographic film asymmetrically around the inner peripheral wall of the enclosure with the ends of the film in close proximity to each other and completely encircling the specimen comprising a first pin member positioned at an angle about 20° and about 75° from one axis of the X-ray beam and second adjustable pin member closely adjacent to the first pin member for positioning the ends of the film on the inner peripheral wall.

5. A camera for X-ray diffraction photography of powder specimens comprising a cylindrical hollow metal enclosure, a pair of diametrically opposed apertures in the wall of said enclosure, a collimating system for directing a beam of X-radiation along a given axis at a specimen in the enclosure which extends through one of the said apertures in the peripheral wall, an exit tube axially aligned with said collimating system for receiving X-radiation passing directly through the specimen, and means to mount a photographic film asymmetrically around the inner peripheral wall of the enclosure with the ends of the film in close proximity to each other and completely encircling the specimen comprising a film stop member positioned at an angle of about 45° with the portion of axis of the X-ray beam passing through the exit tube.

ARTHUR J. C. WILSON.

REFERENCES CITED

The following references are of record in the file of this patent:

UNITED STATES PATENTS

| Number | Name | Date |
| --- | --- | --- |
| 2,317,329 | McLachlan, Jr. | Apr. 20, 1943 |
| 2,341,108 | McLachlan, Jr. | Feb. 8, 1944 |
| 2,483,500 | Long | Oct. 4, 1949 |
| 2,514,791 | Parrish et al. | July 11, 1950 |

OTHER REFERENCES

"Structure of Metals," Barrett, published by McGraw-Hill Book Co., Inc., New York, 1943, pp. 84–87.